United States Patent [19]

Hogue

[11] Patent Number: 4,906,124
[45] Date of Patent: Mar. 6, 1990

[54] MULTI-PIECE ECCENTRIC ASSEMBLY

[75] Inventor: Mohibul Hogue, New City, N.Y.

[73] Assignee: Deere & Company, Moline, Ill.

[21] Appl. No.: 158,508

[22] Filed: Feb. 22, 1988

[51] Int. Cl.⁴ .............................. F16B 2/02; F16B 7/04
[52] U.S. Cl. ..................................... 403/352; 403/356;
403/337; 403/351; 403/370; 403/379
[58] Field of Search ............... 403/344, 351, 352, 358,
403/368, 369, 370, 378, 379, 355, 409.1, 336,
337, 345, 16, 104; 418/60, 61.1, 61.3, 61.2

[56] References Cited

U.S. PATENT DOCUMENTS

| 687,393 | 11/1901 | Boss | 403/352 |
| 825,428 | 7/1906 | Spencer | 403/358 |
| 4,105,346 | 8/1978 | Gelinas | 403/352 X |

Primary Examiner—Andrew V. Kundrat
Assistant Examiner—Franco Deliguori

[57] ABSTRACT

An eccentric assembly has a one-piece mainshaft with a groove extending part way around its periphery. An eccentric ring has an off-center opening which receives the mainshaft, with part of the ring received by the groove. An arcuate-shaped insert with a tapered hub is received by the ring opening between the shaft opposite the groove and a frustoconical portion or the ring opening so as to claim the ring, shaft and insert together.

6 Claims, 1 Drawing Sheet

MULTI-PIECE ECCENTRIC ASSEMBLY

This invention was made with Government support under Contract No. N00024-85-C-5150 awarded by the Department of the Navy. The Government has certain rights in this invention.

BACKGROUND OF THE INVENTION

This invention relates to a mainshaft eccentric assembly for multi-unit rotary mechanisms.

There have been many attempts at providing an inexpensive yet effective mainshaft for multi-unit rotary mechanisms, such as the Wankel-type rotary engine. For example, built-up or sectional mainshafts have been developed in an attempt to solve the problems of assembly and disassembly. Such designs are shown in U.S. Pat. Nos. 3,279,279 and 3,240,423. However, segmented mainshafts are dificult to align and rigidly couple together. Also, earlier proposed designs, as shown in U.S. Pat. No. 3,062,435, have required complex support structures for the intermediate housing support bearings, the provision of openings in the intermediate housing, and the provision of split stationary gears. This is because a shaft with an integral eccentric cannot pass through a unitary stationary gear. Such arrangements cannot be quickly and easily assembled.

One type of built-up mainshaft is disclosed in Lloyd, Jr., U.S. Pat. No. 4,072,448 wherein the eccentric element is slotted to render the eccentric element inwardly deformable to grip the mainshaft. Another eccentric assembly is described in Grabill, U.S. Pat. No. 1,269,075 where a two-piece eccentric is clamped on a shaft by a pair of wedged-shaped clamping members. However, in both the '448 and '075 designs, the mating surfaces of the mainshafts are cylindrical about a single common axis. Thus, the mating of these surfaces with the other parts of the assemblies does not, by itself, resist relative rotation between the eccentrics and the mainshafts.

SUMMARY OF THE INVENTION

An object of the present invention is to provide an eccentric assembly for a multi-unit rotary mechanism.

Another object of the present invention is to provide such an assembly which permits the use of a one-piece main crankshaft.

A further object of the present invention is to provide such an assembly which can be quickly and easily assembled and disassembled and which resists relative rotation between the parts of the assembly.

These and other objects are achieved by the present invention which includes a one-piece, continuous main crankshaft. At each location where an eccentric assembly is to be mounted, a groove is formed in one side of the shaft. The groove has a cylindrical profile centered about an axis which is offset from the main axis of the shaft. A ring with a cylindrical outer eccentric surface is mounted on the shaft. Part of the ring is received by the groove and includes a surface which is complimentary to and engageable with the bottom surface of the groove. The ring is clamped to the shaft by means of an arcuate-shaped insert which is received by the ring and which includes a concave cylindrical surface which engages the side of the shaft opposite the groove. The insert includes a flange which is bolted to the ring. The insert includes a tapered hub which is received in a complimentary tapered opening in the ring. The ring is accurately oriented with respect to the insert and to the shaft by means of pins inserted in bores, the pins also transmitting torque.

DETAILED DESCRIPTION

The eccentric assembly includes a one-piece elongated shaft 12, a ring 14 and a generally crescent-shaped insert 18 received by the ring 14 and engaging both the ring 14 and the shaft 12.

Figure 1:
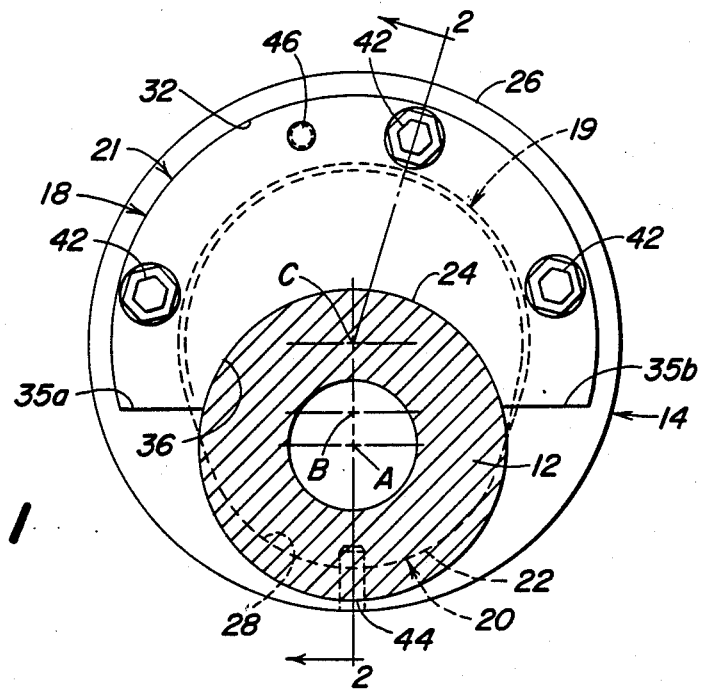
FIG. 1 is a sectional view along an axis of the mainshaft of the present invention.

At each location where an eccentric is to be located, the shaft 12 has a groove 20 extending part way around one side thereof. Except for the groove 20, the outer surface 24 of the shaft 12 is cylindrical about central axis A. The bottom surface 22 of the groove 20 is preferably outwardly convex cylindrical about an axis B which is offset from the central axis A of shaft 12. From FIG. 1 it is clear that axis A is located between axis B and the groove bottom surface 22. The radius of surface 22 may be the same or may be different from the radius of surface 24 of shaft 12. Alternatively, the surface 22 could have a non-cylindrical profile. The surface 22 extends approximately 180 degrees around the shaft 12 and merges smoothly with surface 24.

The ring 14 has an outer surface 26 which is cylindrical about an axis C which is offset from the axis A so that axis B lies between axes A and C. The ring 14 has a first uniformly concave inner cylindrical surface portion 28 which engages groove surface 22. The surface 28 has a profile which is complementary to and mates with the profile of groove surface 22. The ring 14 has a second inner surface portion 30 and a third inner surface portion 32 joined by an axially facing generally crescent-shaped wall 34. Surfaces 32 and 28 are joined by walls 35a and 35b which face in a direction parallel to a plane containing the axis of rotation of shaft 12 and the central axis of cylindrical surface 26. Surface 30 is frustoconical and tapers uniformly from a larger radius end adjacent wall 34 to a smaller radius end at 37, both radii being centered on axis C.

The insert 18 includes a generally crescent-shaped hub 19, one end from which radially extends a generally crescent-shaped flange 21. The insert 18 has a concave first surface 36 with a profile complementary to and engageable with the second surface 24 of the shaft 12.

The flange 21 is received in an arcuate-shaped slot formed by the walls 32, 34, 35a and 35b of the ring 14. The hub tapers from a large radius end adjacent flange 21 to a small radius end 38, both radii centered on axis C. Thus, the hub 19 has a convex outer surface 40 which is complementary to and mates with surface 30 of ring 14. Preferably, the insert 18 is attached to the ring 14 via a plurality of bolts 42. Also, pins 44 and 46 may be used to locate the ring 14 with respect to shaft 12 and insert 18, respectively and to transmit torque therebetween.

It should be noted that surfaces 22, 28 are not cylindrical about the same axis as are surfaces 24, 36. It should also be noted that the total surface comprised of inner surfaces 28 and 36 is non-cylindrical and that the total outer surface comprised of outer surfaces 22 and 24 is also non-cylindrical. As a result, relative rotation between shaft 12 on one hand and the bolted-together ring 14 and insert 18 on the other hand is resisted or prevented because of the mating engagement between these non-cylindrical inner and outer surfaces. Also, the engagement of the tapered hub 19 and the tapered surface 30 wedges or clamps the ring 14 onto shaft 12 as bolts 42 are tightened.

Figure 2:
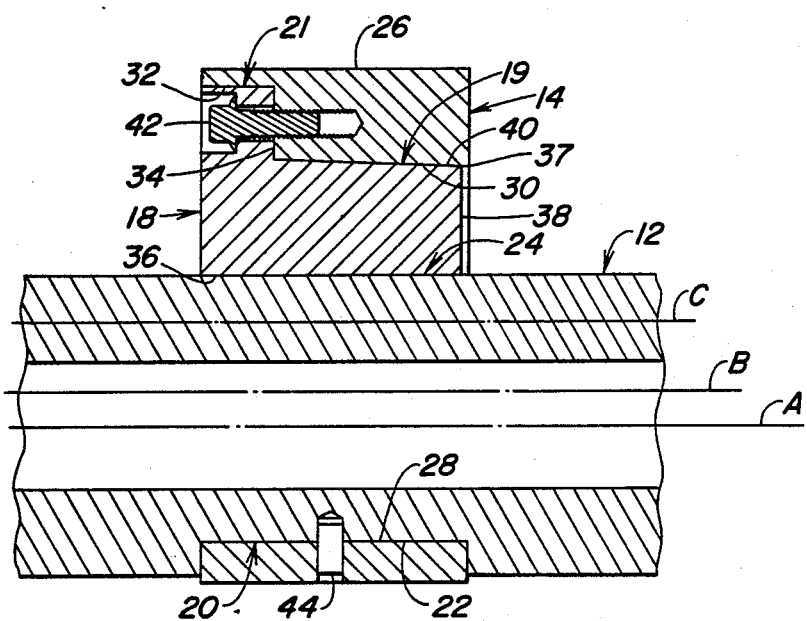
FIG. 2 is a sectional view along lines 2—2 of FIG. 1.

Finally, it should be noted that any or all of the mating pairs of surfaces 22/28, 24/36 and 30/40 could be non-cylindrical as long as the inner-facing surfaces 28, 36 and 30 are complementary to and mate with the respective one of outer-facing surfaces 22, 24 and 40. However, if mating surfaces 24, 36 were made non-cylindrical, then this non-cylindrical portion profile of shaft surface 24 may have to be extended axially to the left of part 18 viewing FIG. 2 for at least a distance equal to the axial width of part 18 so that part 18 can be slid axially along the surface of shaft 12 into the hollow ring 14.

In a multi-unit rotary mechanism, a plurality of the above-described groove and eccentric assemblies may be positioned spaced-apart on the mainshaft.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. An eccentric assembly comprising:
a main shaft having a peripheral groove extending part-way around its periphery, the groove having a cylindrical convex bottom surface about a groove axis which is spaced apart from a central axis of the main shaft;
a hollow ring with an outer surface cylindrical about a ring axis and having an opening therein off-center with respect to the ring axis and surrounded by an inner surface of the ring, the shaft extending through the opening and a portion of the ring being received by the groove, the inner surface of the ring having a portion which is uniformly concave and which matingly engages the groove bottom surface, and the groove axis being located between the ring axis and the central axis of the main shaft;
an insert received by the opening, the insert engaging the ring and engaging a surface of the shaft outside of the groove; and
means for attaching the insert to the ring so as to clamp the shaft, ring and insert together.

2. The assembly of claim 1, wherein the groove extends approximately 180 degrees around the shaft.

3. An eccentric assembly comprising:
a generally cylindrical shaft having a peripheral groove extending part way around the shaft, the groove having a radially outwardly convex cylindrical bottom surface, the bottom surface and a remaining outer surface of the shaft opposite said groove forming a non-cylindrical outer shaft periphery;
a hollow ring having a portion received by the groove, said portion having a first inner surface complementary to and engageable with the groove bottom surface, the bottom surface and the first inner surface being cylindrical about a first axis; and
an insert attachable to the ring and having a second inner surface complementary to and engageable with the remaining outer shaft surface, the first and second inner surfaces forming a non-cylindrical inner surface which non-rotatably receives the shaft and which matingly engages the non-cylindrical outer shaft periphery, the remaining outer shaft surface and the second inner surface being cylindrical about a second axis which is spaced apart from the first axis, the second axis being located between the first axis and the groove bottom surface.

4. An eccentric assembly comprising:
a generally cylindrical shaft having a groove extending part way around the shaft, the groove having a radially outwardly facing bottom surface, the bottom surface and a remaining outer surface of the shaft opposite said groove forming a non-cylindrical outer shaft periphery;
a hollow ring having a portion received by the groove, said portion having a first inner surface complementary to and engageable with the groove bottom surface, the bottom surface and the first inner surface being cylindrical about a first axis;
an insert attachable to the ring and having a second inner surface complementary to and engageable with the remaining outer shaft surface, the first and second inner surfaces forming a non-cylindrical inner surface which non-rotatably receives the shaft and which matingly engages the non-cylindrical outer shaft periphery, the insert comprising a generally arcuate-shaped hub and a flange projecting radially outwardly from one end of the hub, the hub being received by and engaging a portion of the ring, the hub being tapered from a larger radius end adjacent the flange to a smaller radius end opposite the flange, the ring portion having a third inner surface complementary to and engaging an outer surface of the hub.

5. The assembly of claim 4, further comprising:
means extending through the flange for rigidly attaching the flange to the ring.

6. An eccentric assembly comprising:
a generally cylindrical shaft having a groove extending part way around the shaft, the groove having a radially outwardly facing bottom surface, the bottom surface and a remaining outer surface of the shaft opposite said groove forming a non-cylindrical outer shaft periphery;
a hollow ring having a portion received by the groove, said portion having a first inner surface complementary to and engageable with the groove bottom surface, the bottom surface and the first inner surface being cylindrical about a first axis;
an insert attachable to the ring and having a second inner surface complementary to and engageable with the remaining outer shaft surface, the first and second inner surfaces forming a non-cylindrical inner surface which non-rotatably receives the shaft and which matingly engages the non-cylindrical outer shaft periphery, the insert comprising a generally arcuate-shaped hub and a flange projecting radially outwardly from one end of the hub, the ring including an arcuate-shaped slot, the slot receiving the flange of the insert.

* * * * *

UNITED STATES PATENT AND TRADEMARK OFFICE
CERTIFICATE OF CORRECTION

PATENT NO. : 4,906,124

DATED : 6 March 1990

INVENTOR(S) : Mohibul Hoque

It is certified that error appears in the above-identified patent and that said Letters Patent is hereby corrected as shown below:

On the title page, under item [19] and in item [75]:

The inventors name, "Hogue" should be changed to --Hoque--.

Signed and Sealed this

Third Day of September, 1991

Attest:

HARRY F. MANBECK, JR.

*Attesting Officer*  *Commissioner of Patents and Trademarks*